Feb. 1, 1938.   L. E. SCOTT ET AL   2,107,088
REFRIGERATING APPARATUS
Filed Feb. 4, 1935   2 Sheets-Sheet 1

INVENTORS
L. E. Scott
E. A. Smith
BY
ATTORNEY

Feb. 1, 1938. L. E. SCOTT ET AL 2,107,088
REFRIGERATING APPARATUS
Filed Feb. 4, 1935 2 Sheets-Sheet 2

INVENTORS
L. E. Scott
E. A. Smith
BY
ATTORNEY

Patented Feb. 1, 1938

2,107,088

UNITED STATES PATENT OFFICE 2,107,088

REFRIGERATING APPARATUS

Leslie E. Scott and Ernest A. Smith, San Jose, Calif.

Application February 4, 1935, Serial No. 4,770

1 Claim. (Cl. 62—102)

This invention relates to the cooling of air by the use of ice as a refrigerant. As will appear from the following specifications our method is capable of use wherever air cooling is desired. It is however specifically adaptable to the air cooling systems used in buildings of various kinds where a cooling action is only required for short periods of time.

The main object of our invention is to provide a method of air cooling which utilizes and combines the advantageous features of the direct ice melting method of air cooling, with those of the mechanical refrigerating or ice making method.

Ice melting tanks using ice as the refrigerant are very satisfactory as a constant melting temperature is maintained, and a large amount of refrigerating or cooling action may be obtained during a short period of time by the melting of such ice. The chief objection to such a system is the high cost of ice and the confusion and inconvenience caused by its delivery to the ice tank. Also drainage and sewer connections are necessary to dispose of the ice water created by the melting ice.

On the other hand mechanical refrigeration is not practical and successful for short-period air cooling in relatively large areas because it is necessary to have a very large installation in order to supply a sufficient amount of refrigeration during the comparatively short period of time that the air cooling is required. This entails a large outlay of capital and it is not easy nor satisfactory to control the air diffuser or cooling element at a temperature high enough to prevent excessive dehydration.

For instance, we cite the cooling of a chapel in an undertaking establishment, having a capacity of 200 persons and where it is only necessary to cool the chapel for two hours a day, if that. Under conditions such as take place in a funeral chapel it is estimated that each person will give off 500 B. t. u.'s of heat per hour. Assume that the service in the chapel consumes two hours, which for 200 people makes a total of 400 people hours. The total heat then to be consumed from this audience would be 400 × 500, or 200,000 B. t. u.'s.

In addition, let us say that the amount of heat to be removed from the chapel due to conduction and other sources will amount to 88,000 B. t. u.'s. This then gives a total heat load to be removed of 288,000 B. t. u.'s.

To take care of this heat load would require the melting of 2000 lbs. of ice during the two-hour period, since the melting of each pound of ice to water at 32° F. requires the absorption of 144 B. t. u.'s of heat. The cost of installation of an ice melting tank and the accompanying accessories is relatively low, but the cost and inconvenience of handling a ton of ice every day is considerable.

The cost of installing a direct expansion cooling system and refrigerating machine to do this same amount of work during the two-hour period would be prohibitive because a compressor capable of producing twelve tons of refrigeration per twenty-four hours would be necessary. The capital investment then required in this case to do the cooling mechanically would be many times more than that necessary for the ice installation, and the operating cost for an installation of this size would be beyond practicability. On the other hand, if a mechanical unit of two-tons capacity per twenty-four hours could be employed the investment cost would be very low and likewise the operating cost for power would be very reasonable. Such a low cost installation minus any inconvenience in the operation of the same may be utilized by our method as will be seen from the following description.

The accompanying drawings diagrammatically illustrate different ways in which our method may be carried out.

In the drawings, Figure 1 is a sectional plan of an ice and direct air circulating tank having heat absorbing or evaporator coils therein which are part of a mechanical refrigerating unit.

Figure 1:
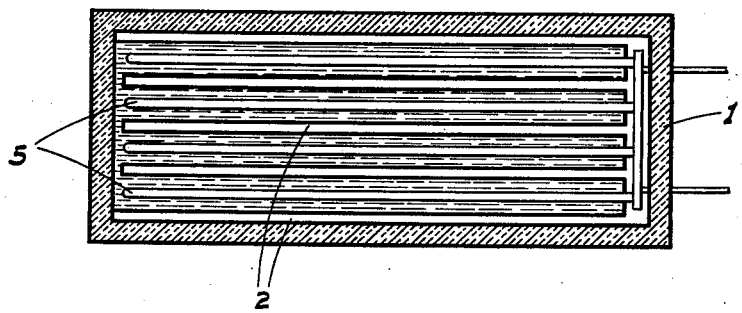
Figure 2:
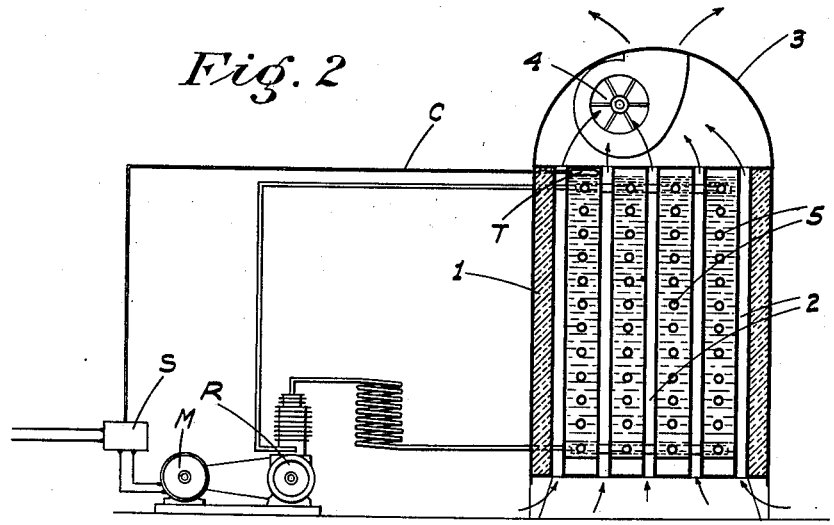
Figure 2 is a transverse section of the complete apparatus.

Referring now more particularly to the characters of referenec on the drawings, and particularly at present to Figures 1 and 2, the example of an apparatus there shown for carrying out our method comprises an insulated sealed tank 1 raised clear of the floor and having a number of open ended vertical passages 2 extending from top to bottom of the tank. The passages discharge into a closed chamber 3 above the tank in which a suction fan 4 is located, the intake of the fan being inside the chamber while its outlet discharges into the room above the chamber. Any other natural or forced draft means for circulating the air through the passages may of course be employed instead. The tank is substantially filled with water which of course surrounds the air passages and coils 5 from an exteriorly located mechanical refrigerating unit R extending through the water containing areas of the tank between the different air passages.

If the apparatus above described is intended for service under the conditions such as are given in the preamble, the tank has an ice capacity of one ton, while the mechanical unit has a one ton capacity per twenty-four hours—a relatively small unit as regards investment and operating costs, as will be evident.

Suitable known control devices of selected design for the operation of the mechanical unit may be provided as is customarily the case so that when the maximum amount of ice that is required has been produced around the evaporator coils 5 in the tank 1, the mechanical unit will cease its operation, and will remain stopped until a certain amount of this ice has been melted in producing refrigeration or cooling for the purpose for which it is intended. At this predetermined point the mechanical unit will again operate and will help to produce refrigeration in addition to that which the remaining ice is capable of producing. These control devices would include as usual the thermal control bulb T within the ice chamber having connections C with the control switch S in the motor circuit of the compression motor M.

By the method above described a uniform temperature of the air being circulated is obtained for the purpose of cooling the surrounding premises. The difficulties occasioned in temperature control incident to common mechanical refrigeration are overcome by the fact that the sole duty of the mechanical unit is to make ice during off peak intervals and to help furnish refrigeration during peak periods through the medium of this ice. A comparative small and inexpensive mechanical unit may be employed because with our method the ice tank has capacity sufficient to store up refrigeration during light or off peak periods sufficient for the total peak period of operation.

Figure 3:
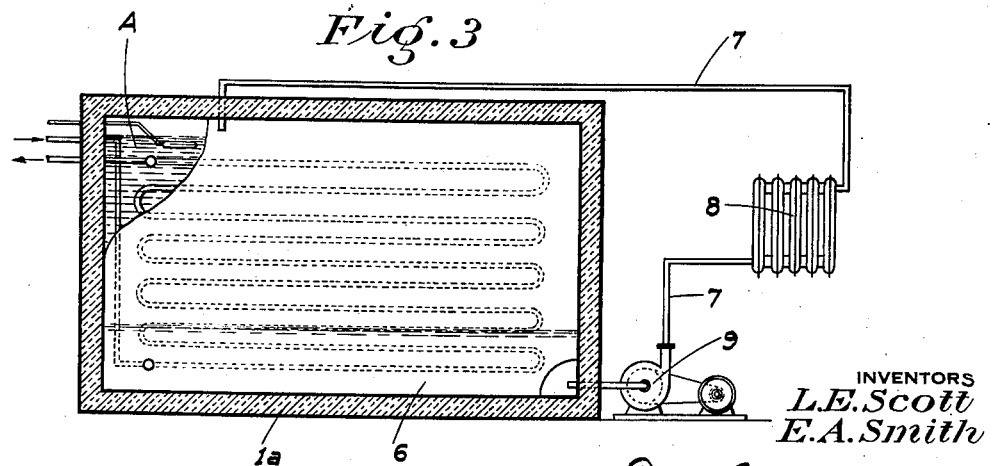
Figure 3 is a vertical longitudinal section of a combined ice tank and liquid circulating apparatus, instead of the air circulating tank shown in Figures 1 and 2.

The foregoing describes the invention as applied to the direct air cooling unit in which the ice tank is arranged to function also as a radiator by having the air circulated over and around such ice tank. In Figure 3 we have disclosed the adaptation of the invention to a water circulating system in which the melting ice water is circulated by a pump or other circulating means through radiators remote from the ice tank.

In the construction of Figure 3 we provide separate but connected chambers 6 in the tank 1a between the coil containing ice area A. These chambers are connected at top and bottom by suitable piping 7 to diffusers 8. The tank is filled with water and the controls are set so that there will be allowed to remain in the tank at all times a small amount of 32° water or lower temperature liquids if lower degree cooling temperatures are desired. If lower than 32° is desired a predetermined percentage of sodium or calcium chloride may be added to the water for the purpose of reducing its freezing and melting points to the temperatures desired. At no time however should chlorides be added in percentages great enough to prevent the freezing of the mixture as the storage of refrigeration in our method is accomplished through the change of state of the liquid by the latent heat of fusion.

The ice in the area A is formed during the period that the water is not being circulated through the radiators 8. Then when cooling is desired the pump 9 is started and as the reserve water is first circulated through the radiators the ice begins to melt. Continued operation of the pump moves this melted water through the radiators where the surrounding area is cooled by the heat exchange from the area to be cooled to the circulating water. When the ice has melted down to the predetermined amount for which the controls have been set the mechanical unit again commences to operate and helps to maintain refrigeration in addition to that furnished by the melting ice just as is also done in the self contained radiator type of Figures 1 and 2.

Figure 4:
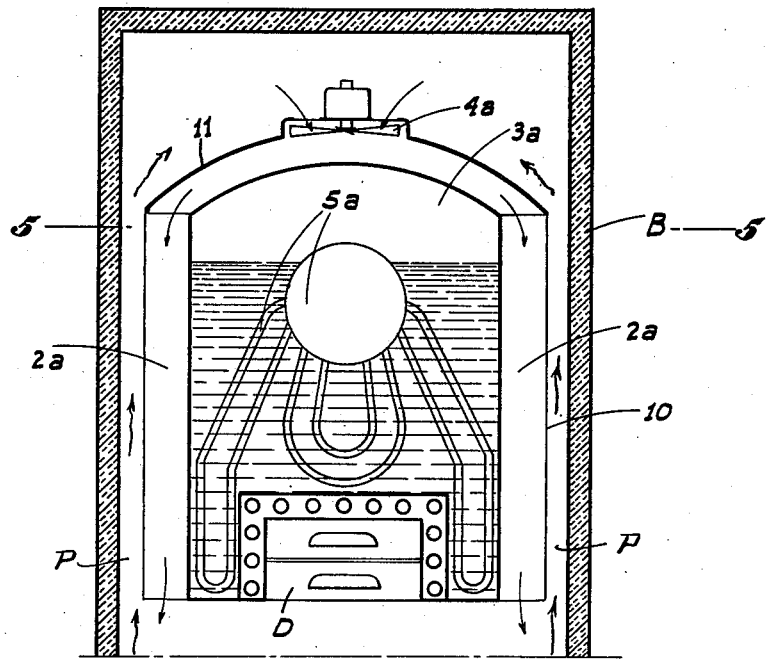
Figure 4 is a vertical section showing the application of our improved invention to a household refrigerator.
Figure 5:
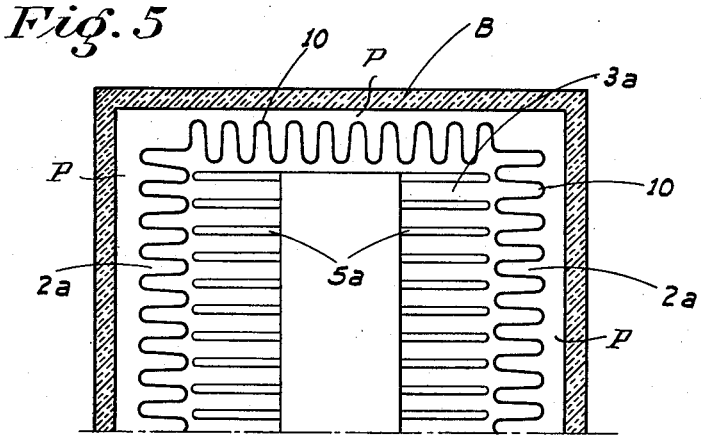
Figure 5 is a section on line 5—5 of Figure 4.

In Figures 4 and 5 we have shown the adaptation of the invention to household refrigerators and any other domestic or commercial refrigerating units. For this use we would preferably use the self contained radiator type of unit. This could be either built directly into new refrigerators or could be installed in lieu of either the ice tanks of ice melting refrigerators or in the refrigerating compartment of mechanical refrigerators.

Here the ice chamber 3a of our unit is mounted within the refrigerator compartment, in spaced relation to the insulated walls B thereof, so as to leave return air passages P between said walls and the chamber on opposite sides and at the back. The chamber walls have vertical radiating fins 10, forming air circulating spaces or passages 2a therebetween outwardly thereof. Within the chamber are provided the mechanical refrigerating coils 5a. Above the chamber 3a is a circulating fan 4a mounted in connection with a deflecting wall 11 spaced from the top wall of the chamber and overhanging the finned passages 2a at the top. In this manner, the air in the refrigerator is circulated past the walls of the ice chamber 3a, thus effecting the cooling operation in a manner similar to that described by the mechanism disclosed in Figures 1 and 2. The usual ice drawers D, to contain a limited supply of ice for withdrawal, are also mounted in connection with the chamber 3a and coils 5a.

Our novel unit in all its adaptations has many advantages, chief of which are as follows:

1. It affords a constant temperature, in a refrigerator easily taking care of heavy overloads. This is due to its large exposed surface which at all times remains slightly moist which is an ideal condition for heat transfer.

2. No defrosting is necessary as is the case in mechanical refrigerators.

3. There is no excessive dehydration as is so common to the effective operation of purely mechanical refrigerators.

4. There is a higher rate of heat transfer due to the liquid contact with the evaporator coils making it possible to increase refrigerating effect of compressor.

5. The unit stores refrigeration within itself and supplies it on demand. This storage is accomplished by the freezing of the ice when load is less than the capacity of the refrigerating unit and an overload being taken care of by the melting of ice as the refrigerating load increases.

6. The unit is readily installed in any refrigerator either as original equipment or substituted for other types of units.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described our invention, what we claim as new and useful and desire to secure by Letters Patent is:

A refrigerating unit comprising with an enclosed compartment, an enclosed ice chamber mounted within the compartment and having its side walls spaced from the walls of the compartment to form air passages therebetween, a refrigerating element within the chamber, the side walls of the chamber being formed with vertical hollow fins open to the interior of the chamber and spaced apart horizontally to allow of a vertical flow of air therebetween outwardly of the chamber, a deflecting wall mounted with the chamber disposed over and spaced from the top of the chamber and overhanging said fins at the top thereof, said wall having a central opening and a fan mounted on the chamber to blow air downwardly through said opening from the space in the compartment above the same.

LESLIE E. SCOTT.
ERNEST A. SMITH.